April 2, 1929.  L. Q. SLOCUMB  1,707,645
RADIO RECEIVING APPARATUS
Filed Sept. 29, 1923
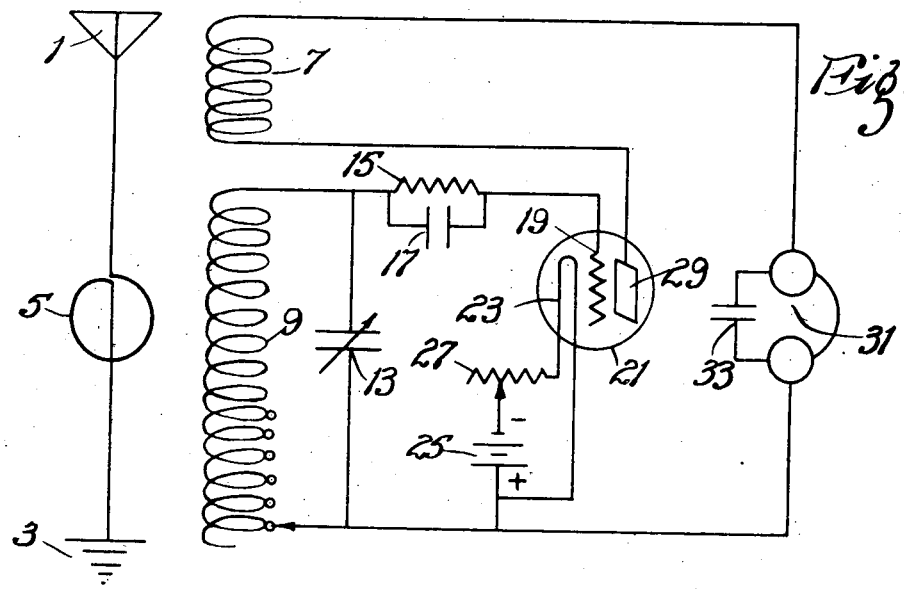
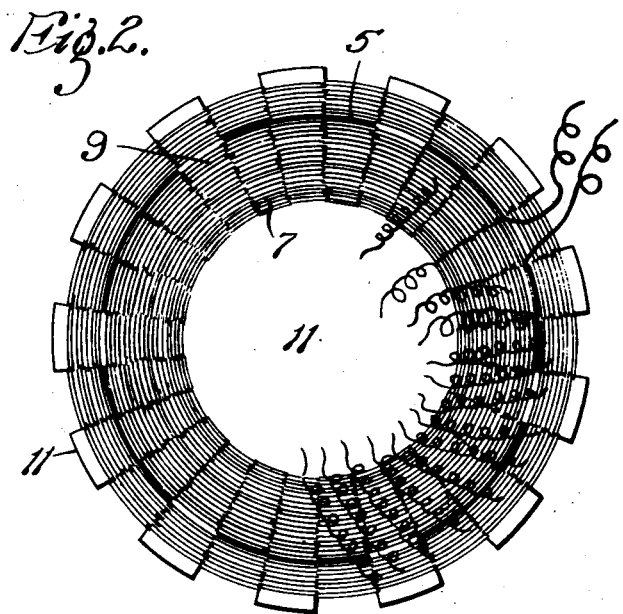
Lloyd Q. Slocumb,
Inventor,
Delos G. Haynes,
Attorney Patented Apr. 2, 1929.

1,707,645

UNITED STATES PATENT OFFICE.

LLOYD Q. SLOCUMB, OF FERGUSON, MISSOURI.

RADIO RECEIVING APPARATUS.

Application filed September 29, 1923. Serial No. 665,687.

This invention relates to radio receiving apparatus, and with regard to certain more specific features, to regenerative detector apparatus utilizing a single battery.

Among the several objects of the invention may be noted the provision of a highly sensitive apparatus adapted for accurate calibration; and the provision of a simple and inexpensive device, readily installed and easily operated. Other objects will be in part obvious and in part pointed out hereinafter.

The invention accordingly comprises the features of construction, elements and combinations of elements, and arrangements of parts, which are exemplified in the constructions hereinafter described and the scope of the application of which will be indicated in the following claims.

In the accompanying drawings, in which is shown one of various possible embodiments of this invention, Fig. 1 is a wiring diagram; and Fig. 2 is a face view of a spider-web inductance coil.

Similar reference characters indicate corresponding parts throughout the several views of the drawings.

Referring now more particularly to Fig. 1 of the accompanying drawings, there is illustrated at 1 an aerial connected to ground 3 through a single-turn aerial or primary coil 5, thus forming an aerial circuit.

In co-operative relation to the aerial coil 5 are two coils 7, 9. Coil 7 is connected in the plate circuit and may be termed the plate or feed back coil. Coil 9 is in the grid circuit and may be termed the grid or secondary coil. Coils 5 and 9 constitute a radio frequency transformer.

Referring now to Fig. 2, a preferred physical relationship between the coils 5, 7 and 9 is shown. The three coils are shown as wound upon a spider-web 11 constructed preferably of fibre. The aerial or primary coil 5 is shown as a heavy line. The plate or feed back coil 7 and grid or secondary coil 9 are shown in lighter lines, and are wound in close proximity with each other and with the aerial coil.

The number of turns on the grid coil 9 is adjustable, as indicated in Fig. 1, for tuning purposes.

Bridged across the grid coil 9 is a variable tuning condenser 13.

In the circuit of the grid coil 9 is a high-resistance grid leak 15 shunted by a small condenser 17. The lead from the upper grid coil goes then to the grid 19 of the three-electrode vacuum tube 21. The above describes the input circuit.

The filament 23 of the vacuum tube 21 receives its energy from the battery 25 through an adjustable resistance or filament rheostat 27 on the negative side of the battery 25.

The plate or feed back coil 7 is connected on one side to the plate 29 of the vacuum tube 21, and on the other side it is connected to the head set or telephone receiver 31 and thence to the positive side of the battery and to the lower end of the grid coil 9. This comprises an output circuit. The battery comprises a direct current source of filament supply.

The telephone receivers 31 may be shunted by a small condenser 33.

The following dimensions and sizes have been found to operate satisfactory: Spider web 11, inside diameter 2⅛ inches. Plate coil 7 is wound first, 50 turns of No. 40 insulated wire. Grid coil 9 is wound next, 20 turns of No. 40 insulated wire, with a tap. Then comes the single turn aerial ground circuit. Then comes 50 more turns of the grid coil 9, tapped at intervals of 5 turns, so that any number of turns from 20 to 70 can be obtained. A so-called 201—A vacuum tube or amplifier tube is used. The grid leak resistance 15 is ½ megohm. The grid condenser has a capacity of .0001 m. f. The variable condenser 13 has two stator plates and one rotor plate.

The 20 turns of the grid coil will tune in stations of approximately 200 meter wave length. Stations of greater wave length may be tuned in by using the other taps of the grid coil. By using the entire 70 turns, stations of greater wave length than 600 meters may be tuned in. The three-plate variable condenser 13 covers approximately 15 turns of the grid coil 9.

The battery 25 may comprise dry cells or a storage battery of approximately four volts. Ducon fixed condensers are used at 17 and 33. A Bradleystat compression-type rheostat is used at 27. The condenser 33 is of about .006 m. f. capacity and may be dispensed with. Other types of vacuum tubes may be used, such as UV—200.

In using the apparatus of this invention, accurate tuning has been obtained, together with clear articulation and successful exclusion of local broadcasting stations of a wave length quite close to the wave length to which the apparatus was tuned at the time.

The length of aerial may be varied greatly without substantially affecting the operating characteristics of the apparatus.

It will be noted that the grid return of the input circuit and the output circuit have a common connection to the positive side of said source of filament supply.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

A radio receiving circuit comprising a regenerative detector including a three-electrode vacuum tube having grid, plate and filament, and a radio frequency transformer having primary and secondary coils, an aerial circuit including said primary coil, an input circuit including said grid and said secondary coil, a grid leak, a diret current source of filament supply, a filament rheostat and said filament connected in series, said rheostat being connected to the negative side of said source, and a tuning condenser shunting said secondary coil; an output circuit including the plate of said tube, a feed back coil inductively coupled to the transformer coils, and a telephone receiver connected in series, the grid return of the input circuit and said output circuit having a common connection to the positive side of said source of filament supply.

In testimony whereof, I have signed my name to this specification this 26th day of September, 1923.

LLOYD Q. SLOCUMB.